United States Patent [19]

Harrison

[11] 4,039,070
[45] Aug. 2, 1977

[54] DIVERTING CONVEYOR SYSTEM

[75] Inventor: Franklin L. Harrison, Hagerstown, Md.

[73] Assignee: American Chain & Cable Company, Inc., Bridgeport, Conn.

[21] Appl. No.: 693,764

[22] Filed: June 8, 1976

[51] Int. Cl.² .......................................... B65G 47/52
[52] U.S. Cl. .................... 198/370; 198/597; 198/611; 198/790
[58] Field of Search ............... 198/366, 367, 368, 369, 198/370, 372, 456, 457, 458, 575, 597, 601, 611, 790

[56] References Cited

U.S. PATENT DOCUMENTS

| 1,763,809 | 6/1930 | Murphy | 198/367 |
|---|---|---|---|
| 1,822,111 | 9/1931 | Richardson et al. | 198/597 |
| 1,881,895 | 10/1932 | Olson | 198/372 |
| 1,919,837 | 7/1933 | Gotthardt | 198/790 |
| 2,130,330 | 9/1938 | Sibley | 198/368 |
| 3,146,875 | 9/1964 | McGow et al. | 198/372 |
| 3,384,237 | 5/1968 | Leonard | 198/370 |
| 3,605,991 | 9/1971 | Burt et al. | 198/790 |

Primary Examiner—Evon C. Blunk
Assistant Examiner—Richard K. Thomson
Attorney, Agent, or Firm—Barnes, Kisselle, Raisch & Choate

[57] ABSTRACT

A conveyor system comprising an endless belt for carrying articles past a series of transfer stations along the length of the belt. A plurality of longitudinally spaced rotatably mounted rollers are provided beneath the belt at each transfer station and a plate is positioned above the rollers for supporting the belt at each transfer station. The width of the rollers is greater than the width of the belt and the rollers are continuously driven by the return portion of the belt which extends beneath the rollers. A pusher at each transfer station is actuatable transversely to transfer an article from the belt onto the rollers which, in turn, propel the article in a direction parallel to the belt.

11 Claims, 5 Drawing Figures

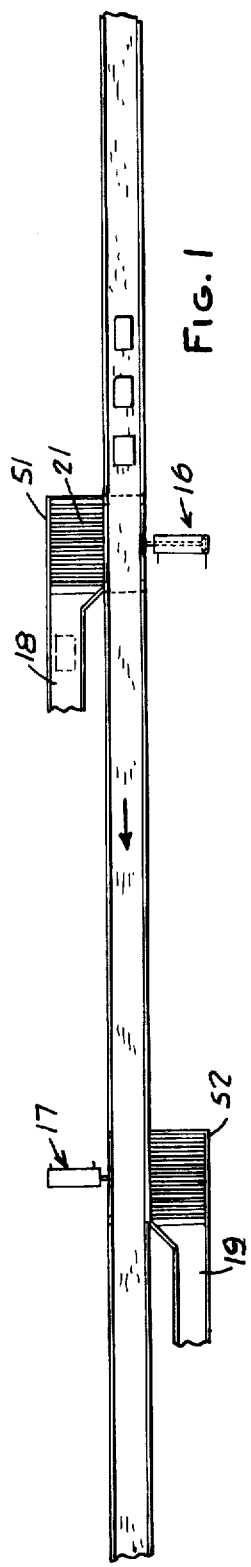
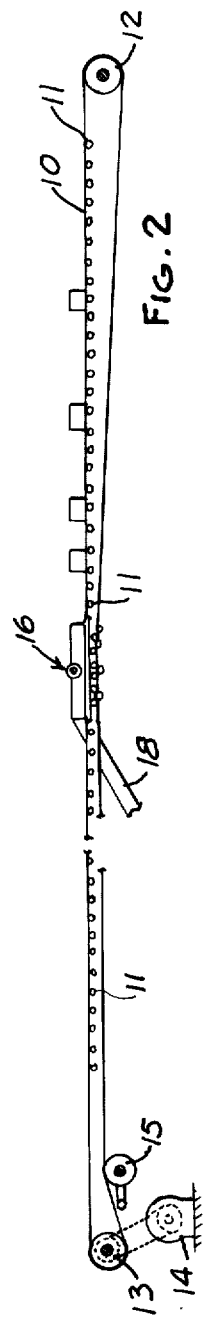
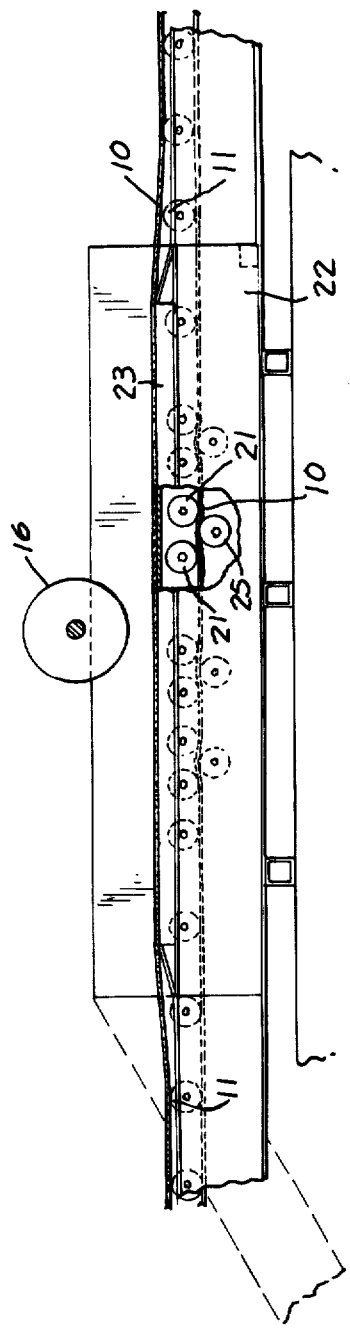

DIVERTING CONVEYOR SYSTEM

This invention relates to conveyor systems and particularly such systems which include means for diverting articles as they are moved along by the conveyor.

BACKGROUND OF THE INVENTION

In the movement of articles by conveyor systems such as belt conveyors, it is sometimes necessary to divert the articles onto conveyors running parallel to the main conveyor. Among the objects of the invention are to provide such a system wherein the diverting of the articles is achieved with a relatively simple mechanism and in an efficient manner.

SUMMARY OF THE INVENTION

In accordance with the invention, a plurality of longitudinally spaced rollers are rotatably mounted beneath the belt at each transfer station and means are provided for supporting the belt above the rollers at the transfer station. The rollers are driven continuously from the belt. The width of the rollers is greater than the width of the belt and means are provided for moving articles on the belt transversely at the transfer station from the belt onto the rollers at the transfer station which, in turn, move the articles parallel to the belt.

DESCRIPTION OF THE DRAWINGS

FIG. 1 is a diagrammatic plan view of a system embodying the invention.

FIG. 2 is a diagrammatic elevational view of the system shown in FIG. 1.

FIG. 3 is a part sectional elevational view of a portion of the system at a transfer station.

DESCRIPTION

Figure 5:
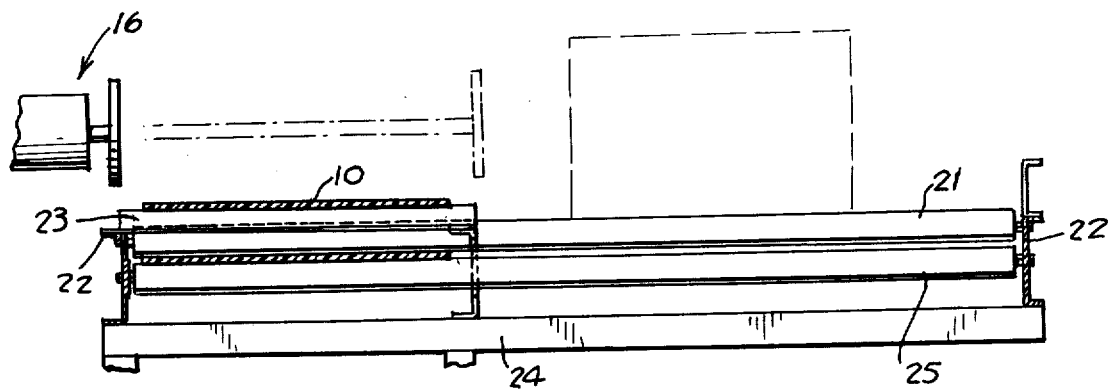
FIG. 5 is a part sectional end view.

Referring to FIG. 1, the system embodying the invention includes a belt 10 which is supported by idler rollers at longitudinally spaced points and is trained over an idler 12 at one end and a driven roller 13 at the other which, in turn, is rotated by a motor 14 and the belt is held under tension by a tension roller 15.

In such a system, it is desirable to divert articles at various points such as stations S1, S2 through the use of transfer mechanism such as pushers 16, 17 so that the articles are transferred onto chutes or other conveyors 18, 19 moving along parallel to the belt 10.

Figure 4:
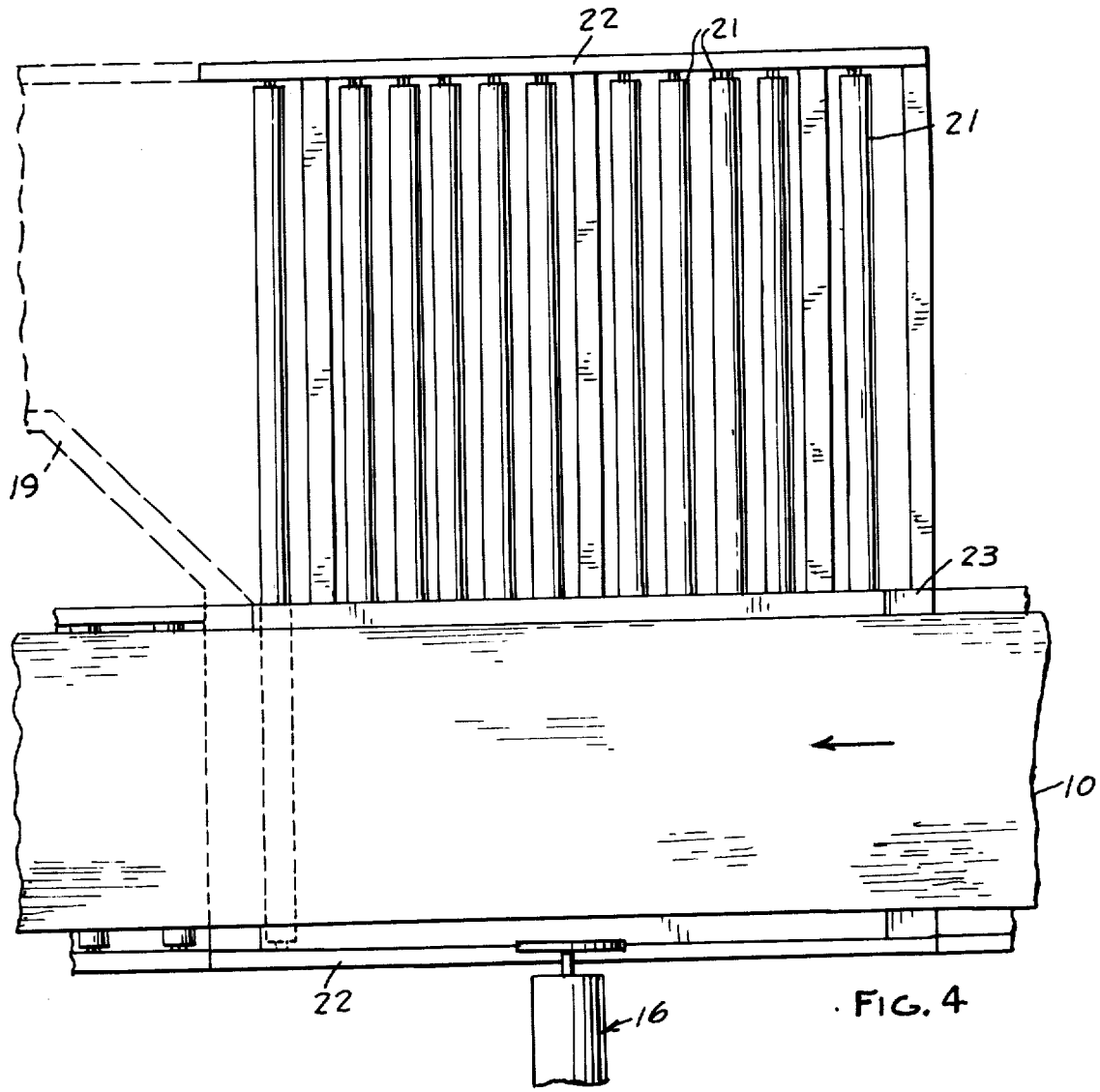
FIG. 4 is a fragmentary plan view of a portion of the system.

Referring to FIGS. 3-5, in accordance with the invention, a diverter section or assembly is provided at each station S1, S2 and comprises a frame 22 that rotatably supports the drive rollers 21 that extend transversely and are spaced longitudinally with respect to the belt 10. In addition, frame 22 includes a sub-frame 24 that supports a plate 23 above the rollers 21 for supporting the belt 10 at the transfer station so that the belt 10 is elevated as it passes the transfer station. Drive rollers 21 are driven by engagement with a return portion of the belt 10 held against the underside of the rollers 21 by pressure rollers 25. The length of the rollers 21 is greater than the width of the belt and the plate so that the rollers extend to one side or the other of the belt.

In operation, as an article is carried by the belt 10 past a transfer station and an appropriate signal is received from a control mechanism or an operator, the pusher 16, 17 is actuated to transfer an article from the belt 10 as it passes over the plate 23 onto the rollers 21. Since the rollers 21 are continuously driven, the rollers 21 positively take away the article and deliver it to a chute or other conveyor 18, 19 extending generally parallel to the belt 10.

In the event that it is desired to deliver the article in a direction opposite to that in which the belt 10 is moved, intermediate idler rollers are provided between the pressure rollers 25 and drive rollers 21 so that the direction of rotation of the drive rollers 21 is reversed.

It can thus be seen that there has been provided a conveyor system which will positively transfer articles from a main conveyor to chutes or conveyors extending parallel to the main conveyor; which does not require additional powered means for such transfer; and which receives the drive for the positive delivery of the articles being transferred from the main conveyor. The divert section can be placed anywhere along the belt 10 by removing any normal idler rollers 11 and inserting the section.

I claim:

1. A conveyor system comprising
   an endless belt,
   means for driving said belt,
   at least one transfer station along the length of the belt,
   a plurality of longitudinally spaced rotatably mounted rollers beneath the belt at said transfer station,
   means for supporting said belt above said rollers at said transfer station,
   and means for driving said rollers,
   the width of said rollers being greater than the width of the belt,
   and means for moving articles on said belt transversely at said transfer station from said belt onto said rollers at said transfer station.

2. The combination set forth in claim 1 wherein said means for supporting said belt above said rollers comprises a plate.

3. The combination set forth in claim 1 wherein said means for driving said rollers comprises a return portion of said belt and pressure means forcing said belt against the underside of said rollers.

4. The combination set forth in claim 3 wherein said pressure means comprises pressure rollers.

5. The combination set forth in claim 1 wherein said diverter means comprises a pusher and means for moving said pusher transversely of said belt.

6. A conveyor system comprising
   an endless belt,
   means for driving said belt,
   at least one transfer station along the length of the belt,
   a plurality of longitudinally spaced rotatably mounted rollers beneath the belt at said transfer station,
   means for supporting said belt above said rollers at said transfer station,
   and means for driving said rollers,
   the width of said rollers being greater than the width of the belt,
   and means for moving articles on said belt transversely at said transfer station from said belt onto said rollers at said transfer station,
   said means for supporting said belt above said rollers comprising a plate, said means for driving said rollers comprising a return portion of said belt and pressure means forcing said belt against the underside of said rollers.

7. For use in a conveyor system comprising an endless belt, means for driving said belt, and at least one transfer station along the length of the belt, the combination comprising a plurality of longitudinally spaced rotatably mounted rollers adapted to be mounted beneath the belt at a transfer station, means adapted to support a belt above said rollers at a transfer station, and means for receiving a drive from said belt for driving said rollers, the width of said rollers being greater than the width of the belt, and means for moving articles on said belt transversely at said transfer station from said belt onto said rollers at said transfer station.

8. The combination set forth in claim 7 wherein said means for supporting said belt above said rollers comprises a plate.

9. The combination set forth in claim 7 wherein said means for driving said rollers comprises pressure means for forcing the belt against the underside of said rollers.

10. The combination set forth in claim 9 wherein said pressure means comprises pressure rollers.

11. The combination set forth in claim 7 wherein said diverter means comprises a pusher and means for moving said pusher parallel to said rollers.

* * * * *